April 1, 1930.

I. ROSENBLATT 1,752,654

LIGHTING FIXTURE

Filed May 14, 1929   2 Sheets-Sheet 1

INVENTOR
Isidor Rosenblatt
BY
Dodson & Roe
ATTORNEYS

April 1, 1930. I. ROSENBLATT 1,752,654
LIGHTING FIXTURE
Filed May 14, 1929 2 Sheets-Sheet 2

INVENTOR
Isidor Rosenblatt
BY
Dodson & Roe
ATTORNEYS

Patented Apr. 1, 1930

1,752,654

UNITED STATES PATENT OFFICE

ISIDOR ROSENBLATT, OF BROOKLYN, NEW YORK, ASSIGNOR TO GLOBE LIGHTING FIXTURE MFG. CO., OF BROOKLYN, NEW YORK, A COPARTNERSHIP COMPOSED OF ISIDOR ROSENBLATT, MAX ROSENBLATT, AND LOUIS LOBEL

LIGHTING FIXTURE

Application filed May 14, 1929. Serial No. 362,953.

My invention relates to those fixtures which are designed to reduce labor costs without the sacrifice of the beauty which is so essential in a lighting fixture.

My invention has for its object, to construct a fixture, upon the assembling of which no skilled labor is required and no machine work is necessary, and yet which will, when assembled, present a most attractive appearance.

My means for accomplishing the foregoing object may be more readily understood by reference to the accompanying drawings, in which—

Similar reference numerals refer to similar parts throughout the entire description.

Figure 1:
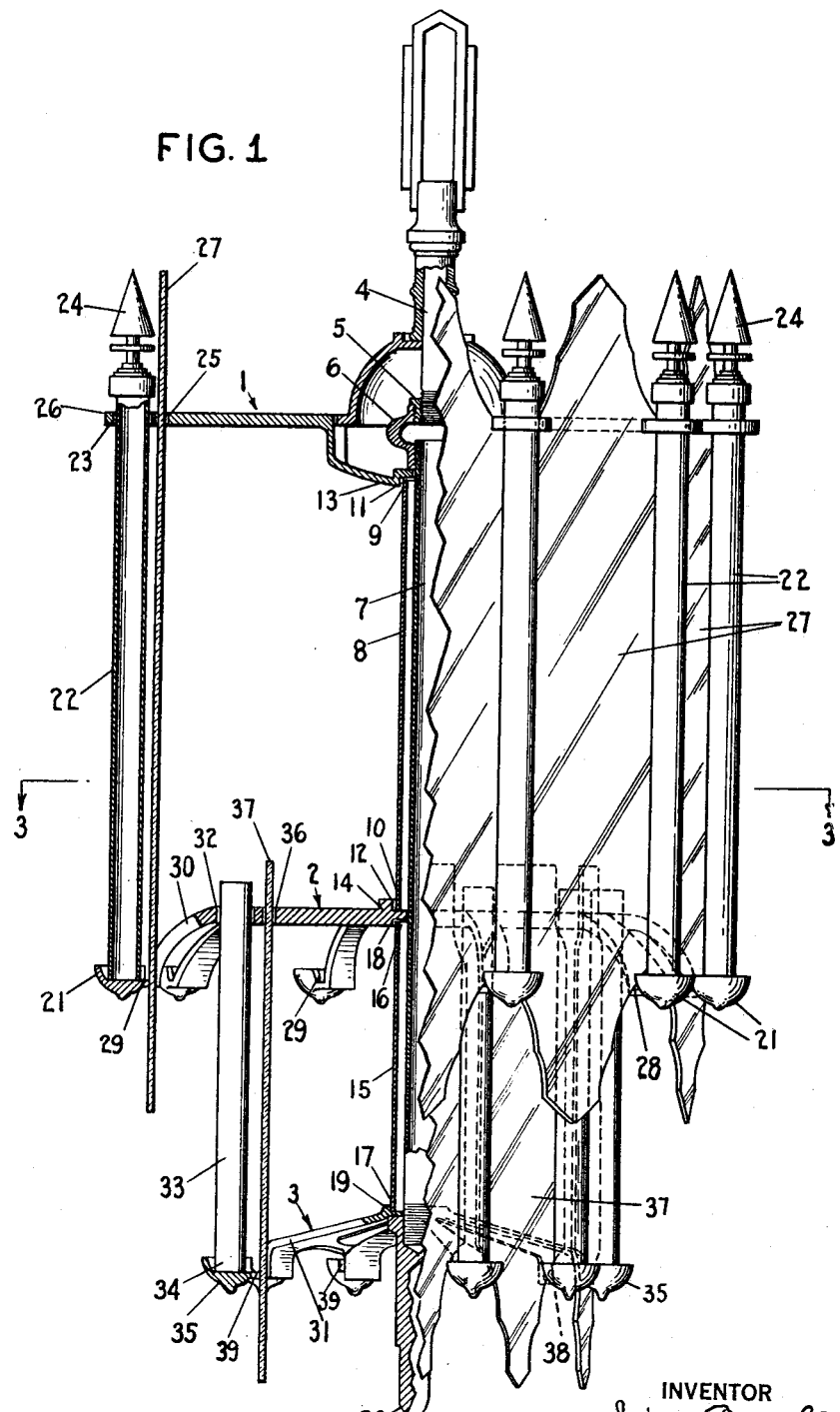
Fig. 1 is a fragmentary side view of the assembled fixture, partly broken away to show the construction.
Figure 2:
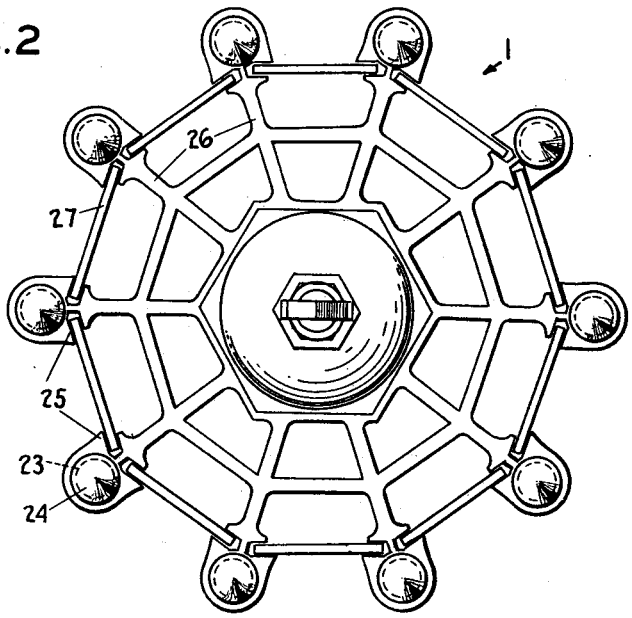
Fig. 2 is a plan view of the fixture.
Figure 3:
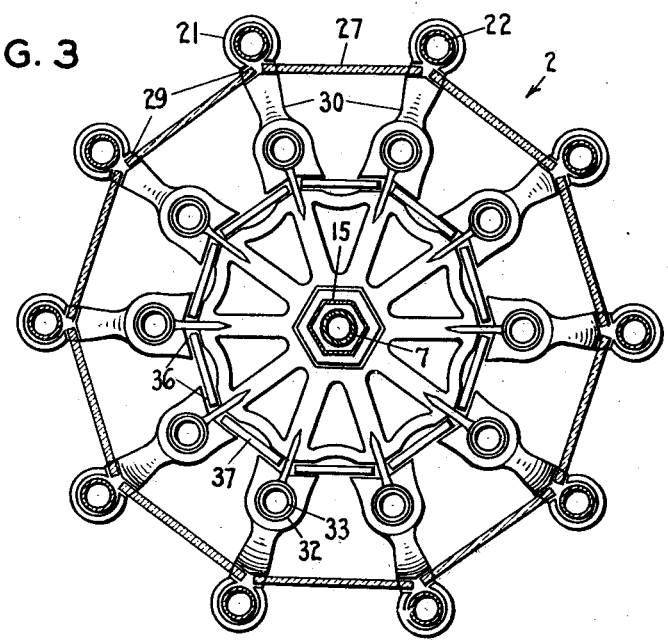
Fig. 3 is a cross-section, taken on line 3—3 in Fig. 1.

As shown in the drawings, the fixture comprises a plurality of spiders, 1, 2 and 3, each having a plurality of radially extending arms. Although I have shown three spiders, I do not wish to be limited to such construction, as it will be clear to persons skilled in the art that my invention is not limited to any number more than two, as the number of spiders is only controlled by the number of steps desired in the fixture.

The fixture is suspended from any standard form of suspension means. As shown, it is a pipe 4, from which extends a nipple 5, which carries the standard hickey 6, to which is secured a rod or tube 7. Surrounding the rod 7, intermediate the spiders 1 and 2, I mount a sleeve 8, which acts as a spacer, the ends 9 and 10 thereof resting in sockets 11 and 12 formed in the central portions 13 and 14 of the spiders 1 and 2. When it is desired to construct the fixture with an additional step, a similar spacer 15 is mounted intermediate the spiders 2 and 3, the ends 16 and 17 of this sleeve 15 resting in sockets 18 and 19 in spiders 2 and 3. The rod 7 extends through the sleeves 8 and 15 and beyond the spider 3, and has a cap or pendant 20 screwed on to its end, thus holding the fixture parts securely together.

In the end of each of the arms 30 of the spider 2, is cast or formed a socket 21, in which rests a rod or tube 22. Each of these rods or tubes 22 is slidably mounted in a hole 23 which is drilled or cast in the end of each of the arms 26 of the spider 1. An ornamental cap 24 is mounted on the upper end of each tube 22. Slots or recesses 25 are provided in the sides of the arms 26, which are adapted to receive panels 27, these panels 27 having shoulders 28 which rest in recesses 29 formed adjacent the sockets 21 on the arms 30 of the spider 2. These panels 27 may be of translucent glass, with plain or etched surfaces, or may be of any other suitable material.

It will be seen from the foregoing that I have described a complete fixture, with spiders 1 and 2. Should it be desired to provide an additional step, then the spacer 15 and the spider 3 are mounted on the rod 7, as heretofore described, and the ends of arms 31 of the spider 3 are constructed with sockets 35, as are the ends of arms 30 of the spider 2. It is also necessary to provide holes 32 in arms 30 of the spider 2, in which to slidably mount tubes or rods 33, the lower ends 34 of which rest in sockets 35 in the ends of the arms 31 of the spider 3. Slots 36 are provided in the arms 30, adjacent the holes 32, to receive the edges of panels 37, which are similar to the panels 27, having shoulders 38 which rest in recesses 39 formed adjacent the sockets 35 in the ends of arms 31 on the spider 3.

To assemble the fixture, the desired number of spiders are placed on the central rod 7, the spacers being placed intermediate each pair of spiders, and the pendant 20 is then screwed on to the end of the rod 7. This holds the body of the fixture securely together. The panels 27 are then placed in position, and rods 22 are dropped into the holes 23 in the ends of arms 26 of the spider 1, their ends resting in the sockets 21 formed on arms 30 of the spider 2. A similar operation is performed in mounting the panels 27 and the rods 33, intermediate spiders 2 and 3.

If it is desired to remove one of the panels 27, all that is necessary is to lift one of the rods 22 adjacent the panel to be removed, sliding said rod 22 freely through the hole 23 in the end of arm 26 on spider 1, when the panel 27 can be lifted and freely and easily removed. This provides for convenient removal and replacement of broken panels, or enables the dealer to change the panels without difficulty, and thus to have a fixture which will present an entirely new and different appearance.

Being translucent, the panels serve to conceal the interior construction of the fixture, so that all that is visible are the panels which are in effect framed by the tubes, which latter may be highly polished, or finished in any desired manner to harmonize with any decorative scheme employed where the fixture is to be installed.

It will be obvious from the foregoing, that in my improved fixture there is no machine work at all, and that any unskilled workman can assemble the fixture quite as easily and satisfactorily as can a workman skilled in the making and installing of lighting fixtures.

Having described my invention, what I regard as new, and desire to secure by Letters Patent of the United States, is:

1. The combination, in a lighting fixture, of a pair of spiders, each having a plurality of radiating arms, one of which spiders has a hole in the end of each of its arms, a socket adjacent the end of each of the arms of the other spider, a central rod on which said spiders are mounted, a cylindrical spacer surrounding said rod intermediate said spiders, the ends of which spacer bear against said spiders, means carried by said rod to hold said spiders rigidly in position, and rods slidably mounted in said holes and adapted to rest in said sockets.

2. The combination, in a lighting fixture, of a plurality of spiders, each having a plurality of radiating arms, said spiders being mounted in spaced relation one above another, the upper spider having a hole in the end of each of its arms, a socket adjacent the end of each of the arms of the other spiders, there being a hole in each arm of the upper and the intermediate spider which registers with the socket on the end of each arm of the spider next below, and rods slidably mounted in said holes and adapted to rest in said sockets.

3. The combination, in a lighting fixture, of a plurality of spiders, each having a plurality of radiating arms, said spiders being mounted in spaced relation one above another, a central rod on which said spiders are mounted, a cylindrical spacer surrounding said rod between each pair of spiders, the ends of which spacers bear against said spiders, means carried by said rod to hold the spiders rigidly in position, the upper spider having a hole in the end of each of its arms, a socket adjacent the end of each of the arms of the other spiders, there being a hole in each arm of the upper and the intermediate spider which registers with the socket on the end of each arm of the spider next below, and rods slidably mounted in said holes and adapted to rest in said sockets.

4. The combination, in a lighting fixture, of a plurality of spiders, each having a plurality of radiating arms, said spiders being mounted in spaced relation one above another, the upper spider having a hole in the end of each of its arms, a socket adjacent the end of each of the arms of the other spiders, there being a hole in each arm of the upper and the intermediate spider which registers with the socket on the end of each arm of the spider next below, rods slidably mounted in said holes and adapted to rest in said sockets, and a plurality of panels detachably mounted intermediate said rods.

5. The combination, in a lighting fixture, of a pair of spiders, each having a plurality of radiating arms, one of which spiders has a hole in the end of each of its arms, a socket adjacent the end of each of the arms of the other spider, a central rod on which said spiders are mounted, a cylindrical spacer surrounding said rod intermediate said spiders, the ends of which spacer bear against said spiders, means carried by said rod to hold said spiders rigidly in position, rods slidably mounted in said holes and adapted to rest in said sockets, and a plurality of glass panels detachably mounted intermediate said rods.

6. The combination, in a lighting fixture, of a plurality of spiders, each having a plurality of radiating arms, said spiders being mounted in spaced relation one above another, a central rod on which said spiders are mounted, a cylindrical spacer surrounding said rod between each pair of spiders, the ends of which spacers bear against said spiders, means carried by said rod to hold the spiders rigidly in position, the upper spider having a hole in the end of each of its arms, a socket adjacent the end of each of the arms of the other spiders, there being a hole in each arm of the upper and the intermediate spider which registers with the socket on the end of each arm of the spider next below, rods slidably mounted in said holes and adapted to rest in said sockets, and a plurality of glass panels detachably mounted intermediate said rods.

7. A lighting fixture, comprising a plurality of spiders with radially extending arms, mounted in spaced relation one above another, the upper spider having a hole in the end of each of its arms, a socket adjacent the end of each arm of each of the other spiders, there being a hole in each of the arms of the intermediate spiders, rods slidably mounted in said holes, the ends of which rest in said sockets, and a plurality of panels detachably mounted intermediate said rods.

8. A lighting fixture, comprising a pair of spiders mounted in spaced relation to each other, there being a plurality of holes in one of said spiders, sockets on the other spider which register with said holes, rods slidably mounted in said holes, the ends of which rods rest in said sockets, and means to hold said spiders rigidly in position.

9. A lighting fixture, comprising a pair of spiders mounted in spaced relation to each other, there being a plurality of holes in one of said spiders, sockets on the other spider which register with said holes, rods slidably mounted in said holes, the ends of which rods rest in said sockets, means to hold said spiders rigidly in position, and a plurality of glass panels detachably mounted intermediate said rods.

ISIDOR ROSENBLATT.